T. W. KENDALL.
CULTIVATOR.
No. 174,684. Patented March 14, 1876.
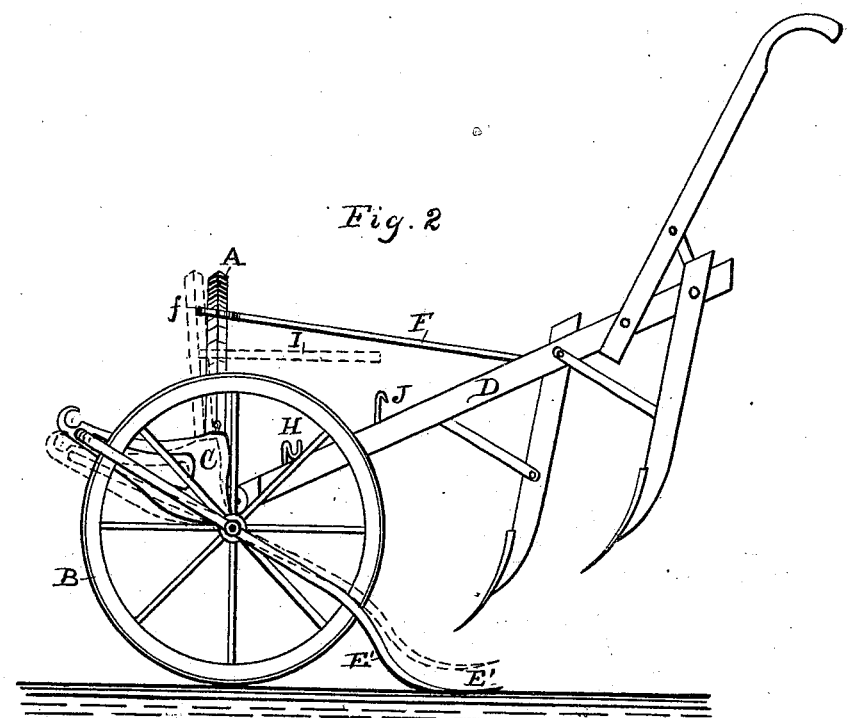
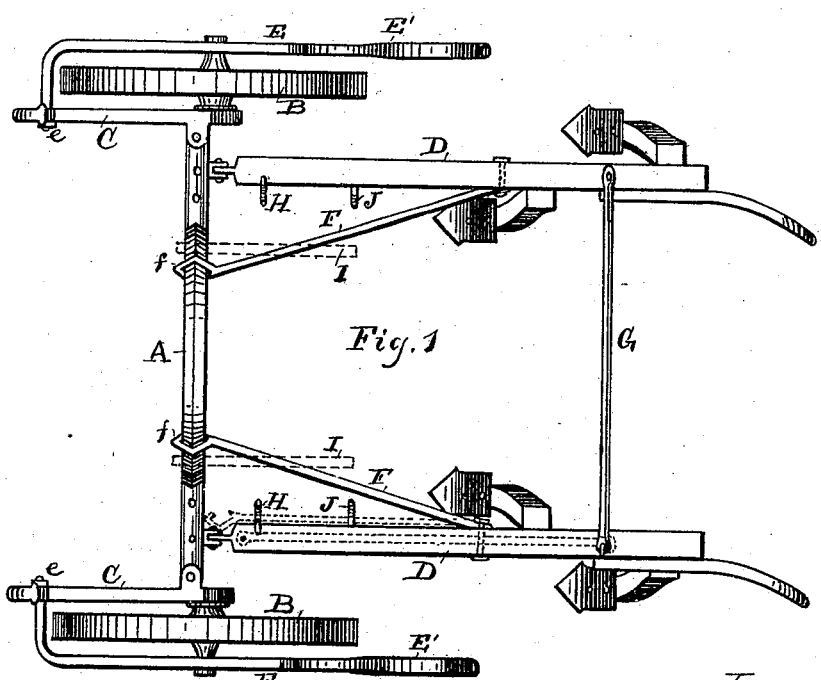

UNITED STATES PATENT OFFICE.

THOMAS W. KENDALL, OF CRESTON, IOWA.

IMPROVEMENT IN CULTIVATORS.

Specification forming part of Letters Patent No. 174,684, dated March 14, 1876; application filed February 1, 1876.

*To all whom it may concern:*

Be it known that I, THOMAS W. KENDALL, of Creston, county of Union and State of Iowa, have invented certain Improvements in Tongueless Cultivators, of which the following is a full, clear, and exact description, and such as will enable others skilled in the art to make and use the same, reference being had to the annexed drawing, in which—

Figure 1 is a top view of a cultivator embodying my invention, and Fig. 2 is a side elevation.

The nature of my invention relates to improvements in tongueless cultivators; and the invention consists, first, in the use of runners, attached to the truck-frame or axle in such manner that they will not interfere with the operations of the machine when in use, and will act as supporting-runners for the axle when the rear ends of the plows are elevated and suspended thereon; and, second, in the combination of hooks or rods for suspending the plows on the axle with said axle and plows, all as hereinafter fully described.

Referring to the drawing by letters, letter A represents the axle, B the wheels, C the draft-plates, and D the plows, of an ordinary cultivator of the tongueless class. E E are the runners, constituting the main feature of my improvement. They are journaled on the outer ends of the spindles of the wheels B, midway their lengths, and their forward ends curved inward, and secured to the draft-plates C by a threaded end and nut, e, while their rear ends are extended backward and downward, and curved into runners E', as plainly shown at Fig. 2, and in such position that when the plows are in operation in the field, and the axle A in its upright normal position, the rear ends E' of the runners E will be above and free from the surface of the ground, and when the rear ends of the plows are elevated and suspended by any means from the axle, the rear ends of the runners will rest upon the ground and support the axle from being pulled backward and downward.

It will be evident that the runners E may be attached rigidly to any suitable part of the axle at one or more points of attachment, and extend backward in the same manner as described for my runner, and perform the same functions in substantially the same manner.

F F are hook-rods, pivoted at their rear ends, one to each of the plow-beams, and their forward ends curved into clamps *f*, which may be slipped on the axle A, and which fit accurately thereon. The forward ends of the hook rods F, when engaged with the axle, will sustain the plows in the elevated position shown at Fig. 2; and to prevent side movement while so elevated they may be united by a rear cross-rod, G. H H are hooks, into which the rods F may be dropped at their forward ends, and thereby sustained when not in use.

A modification of the foregoing suspending device is shown by the dotted line, rearwardly-projecting bars I from the axle, on which the plows may be suspended by hooks J on their beams, also shown by dotted lines.

What I claim as my invention, and desire to secure by Letters Patent, is—

1. The runners E, arranged to support the axle of a tongueless cultivator, with the plows D suspended therefrom, in manner substantially as described.

2. The combination of the runners E, plows D, hook-rods F, and axle A of a tongueless cultivator, substantially as and for the purpose specified.

3. The combination of the axle A, runners E, plows D, hook-rods F, and uniting cross-rod G, substantially as and for the purpose specified.

In testimony that I claim the foregoing as my invention, I have hereunto affixed my signature this 13th day of November, 1875.

THOMAS W. KENDALL.

Witnesses:
  THOMAS MCKEE,
  W. B. RICHARDS.